United States Patent
Phelps

(10) Patent No.: US 12,065,263 B2
(45) Date of Patent: Aug. 20, 2024

(54) CHARGE DISSIPATION PLATE

(71) Applicant: IMPCROSS LTD, Gloucestershire (GB)

(72) Inventor: Martin Phelps, Gloucestershire (GB)

(73) Assignee: Impcross Ltd, Gloucestershire (GB)

( * ) Notice: Subject to any disclaimer, the term of this patent is extended or adjusted under 35 U.S.C. 154(b) by 657 days.

(21) Appl. No.: 17/267,680

(22) PCT Filed: Jul. 16, 2019

(86) PCT No.: PCT/GB2019/051994
§ 371 (c)(1),
(2) Date: Feb. 10, 2021

(87) PCT Pub. No.: WO2020/035653
PCT Pub. Date: Feb. 20, 2020

(65) Prior Publication Data
US 2021/0323693 A1    Oct. 21, 2021

(30) Foreign Application Priority Data
Aug. 15, 2018  (GB) ...................... 1813355

(51) Int. Cl.
*B64D 45/02* (2006.01)
*H01R 13/648* (2006.01)
*H01R 13/74* (2006.01)
*H02G 13/00* (2006.01)

(52) U.S. Cl.
CPC ......... *B64D 45/02* (2013.01); *H01R 13/6485* (2013.01); *H01R 13/746* (2013.01); *H02G 13/80* (2013.01); *H01R 2201/26* (2013.01)

(58) Field of Classification Search
CPC .. B64D 45/02; H01R 13/6485; H01R 13/746; H01R 2201/26; H01R 13/74; H02G 13/80; H05F 3/02
See application file for complete search history.

(56) References Cited

U.S. PATENT DOCUMENTS

| | | | | |
|---|---|---|---|---|
| 4,797,120 A | * | 1/1989 | Ulery | ..................... H01R 24/42 333/260 |
| 2010/0159727 A1 | * | 6/2010 | Chang | ................ H01R 12/7052 439/294 |
| 2017/0339486 A1 | * | 11/2017 | Akino | .................... H01R 35/04 |

OTHER PUBLICATIONS

Souriau, "Connection Technologies 8D Series MIL-DTL-38999 Series III". Catalog [online]. Esterline Connection Technologies, Dec. 31, 2012; [Retrieved on Nov. 4, 2019]. Retrieved from the Internet: <URL: http://www.souriau.co.jp/fileadmin/Souriau/product_pdf/P108-112.pdf>, the whole document.

(Continued)

*Primary Examiner* — Michael C Zarroli
(74) *Attorney, Agent, or Firm* — Keusey & Associates, P.C.

(57) ABSTRACT

A charge dissipation plate for aircraft electronic systems having a metal plate with machined through openings. A collar is integrally formed with each through opening. The collar extends upwardly from the plane of the plate and includes a threaded outer surface for receiving an electronic connector.

3 Claims, 2 Drawing Sheets

(56) References Cited

OTHER PUBLICATIONS

Amphenol Aerospace: "Amphenol MIL-DTL-38999, Series III, TV". Catalogue Amphenol Aerospace, Sep. 10, 2013 pp. 20-45, US. [Retrieved on Nov. 6, 2019]. Retrieved from the Internet: <URL: https://www.amphenol-aerospace.com/pdf/catalogs/38999_III_Catalog.pdf>, the whole document.

Amphenol Aerospace: "We are Your Special Force Amphenol Defence & Aerospace Core: Edition May 2016" Amphenol Defence & Aerospace, May 1, 2016, pp. 1-164, [online brochure], [Retrieved on Nov. 6, 2019]. Retrieved from the Internet: <URL: https:/www.amphenol-airlb.de/files/media/pdf/broschueren/Military_Aerospace_Internet.pdf>, the whole document.

International Search Report and Written Opinion dated Nov. 12, 2019 for International Application No. PCT/GB2019/051994 from the European Patent Office.

Written Opinion of the International Preliminary Examing Authority for International Application No. PCT/GB2019/051994 from European Patent Office dated May 3, 2020.

Notification of Transmittal of the International Preliminary Report on Patentability for International Application No. PCT/GB2019/051994 from European Patent Office dated Nov. 23, 2020.

* cited by examiner

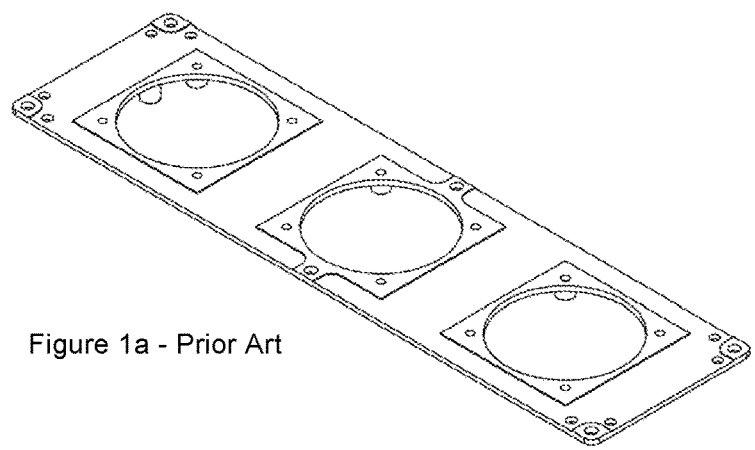
Figure 1a - Prior Art
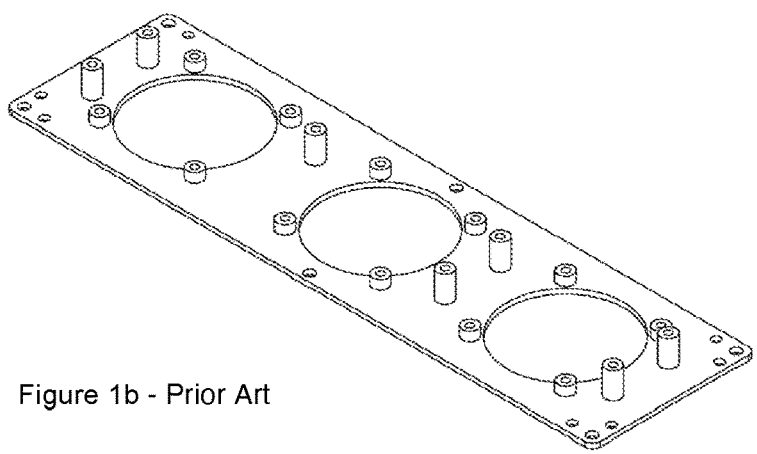
Figure 1b - Prior Art
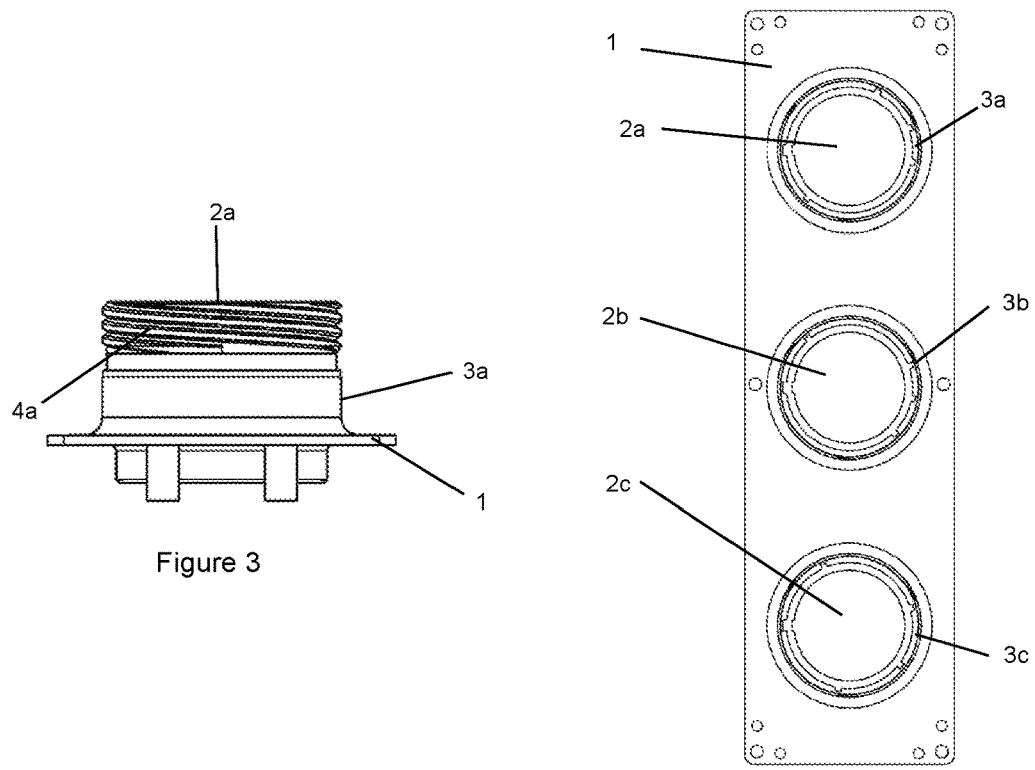
Figure 3
Figure 2

CHARGE DISSIPATION PLATE

BACKGROUND OF THE INVENTION

The present invention relates to improvements in relation to charge dissipation plates for use in conjunction with electronic connectors in aircraft.

Electronic systems are very susceptible to damage caused by being exposed to high electrical charges. IN aircraft, therefore, it is important that electronic systems are protected from high electrical discharges which can arise from the build-up of static during flight or even if the aircraft is struck by lightning. This need for protection extends not only to the electronic systems themselves but also to connectors which link together different electronic systems in the aircraft.

To that end, such electronic connectors are typically mounted on a charge dissipation plate which acts to conduct any unwanted electrical charge away from the connector and dissipate it in the plate. An example of a conventional such lightning dissipater plate is shown in FIGS. 1a and 1b. IT comprises a flat metal plate having a number of circular opening in it, one opening for each connector which is to be mounted to the plate. Each opening has a number of mounting holes associated with it, four in the illustrated example, by means of which a separately formed metal collar having a threaded outer surface and a flange on the bottom may be screwed or bolted to the metal plate so that the collar overlies the opening. A female connector is then mounted in each collar with its associated connected wires extending through the opening in the plate. A mating male connector, also formed on metal can then be engaged onto the collar and secured in place by screwing onto the threaded outer surface of the collar. The wires which connect to both the male and female connectors will typically be surrounded by an earth screen which is electrically connected to the metal collar or metal casing of the male connector respectively. In this way, any unwanted charge will be dissipated into the plate and hence the electronics protected.

The existing design has the drawback, however, that it relies on the electrical connection between the flanged collar and the plate to dissipate unwanted charge from both the male and female connectors. The inventors of the present invention have identified that, in some circumstances, this connection can loosen over time, resulting in a loss in electrical continuity with the dissipater plate and hence leaving the electronics open to exposure to an electrical discharge such as from a lightening strike, static build up or the like.

Furthermore, the latest generation of aircraft aim to reduce weight as much as possible in order to maximise efficiency, and the need for a mounting flange on the collar which overlaps the dissipater plate to enable the two to be fastened together increases with weight of the prior art assembly, thereby making it less desirable.

SUMMARY OF THE INVENTION

According to the present invention there is provided a charge dissipation plate for aircraft electronic systems comprising a machined metal plate having at least one through opening machined therein and an integrally formed collar associated with and extending around the or each opening, the or each collar upstanding from the plane of the plate, and having a threaded outer surface, the or each collar forming a housing for receiving an electronic connector therein, the threaded outer surface, in use, being engagable by a mating threaded connector for connecting with the electronic connector mounted in the collar.

A dissipation plate in accordance with the invention has the advantage that, by making the or each collar integral with the plate, the risk of failure of electrical continuity with the plate is removed and, at the same time, the weight of the assembly is reduced as a result of the removal of the need for the flange on the or each collar.

Preferably, the plate includes a plurality of openings and associated collars, in particular at least 3. The plate may be machined from solid material or may be cast/forged and then subjected to a machining finishing operation.

The collar preferably includes integral keying means which, in use, co-operates with complementary keying means provided on a male connector engageable with the collar so as to ensure correct alignment of connectors. The keying means may, for example, be one or more longitudinal splined formed on the inner surface of the collar, shaping of the interior of the collar or the like.

BRIEF DESCRIPTION OF THE DRAWINGS

In order that the invention may be well understood, there will now be described an embodiment thereof, given by way of example, reference being made to the accompanying drawings, in which:

FIGS. 1a and 1b are front and rear perspective views of a charge dissipation plate assembly according to the prior art;

FIG. 2 is a front view of a charge dissipation plate according to the present invention;

FIG. 3 is an end view of the dissipation plate of FIG. 2;

DETAILED DESCRIPTION OF THE PREFERRED EMBODIMENTS

Figure 4:
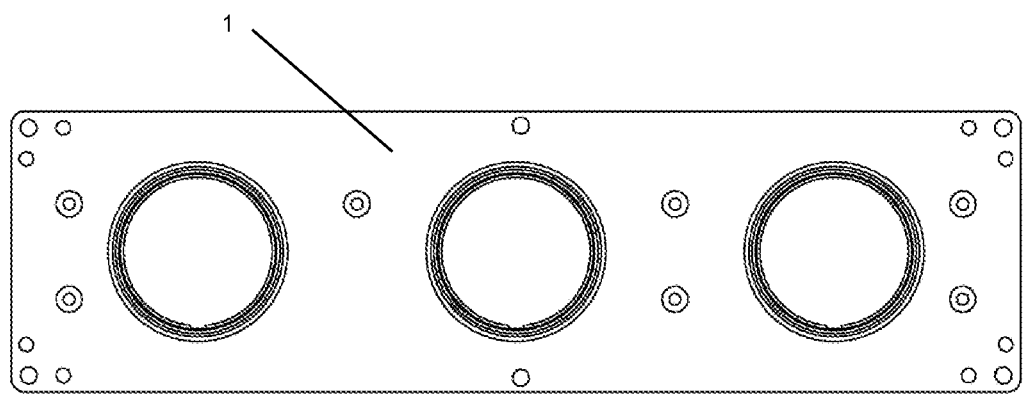
FIG. 4 is a rear view of the dissipater plate of FIG. 2.
Figure 5:
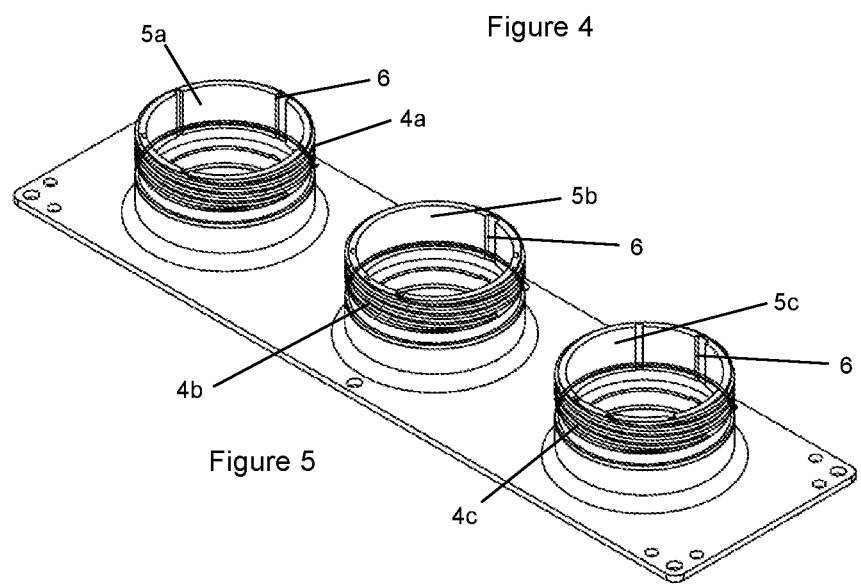
FIG. 5 is a front perspective view of the dissipater plate of FIG. 2.
Figure 6:
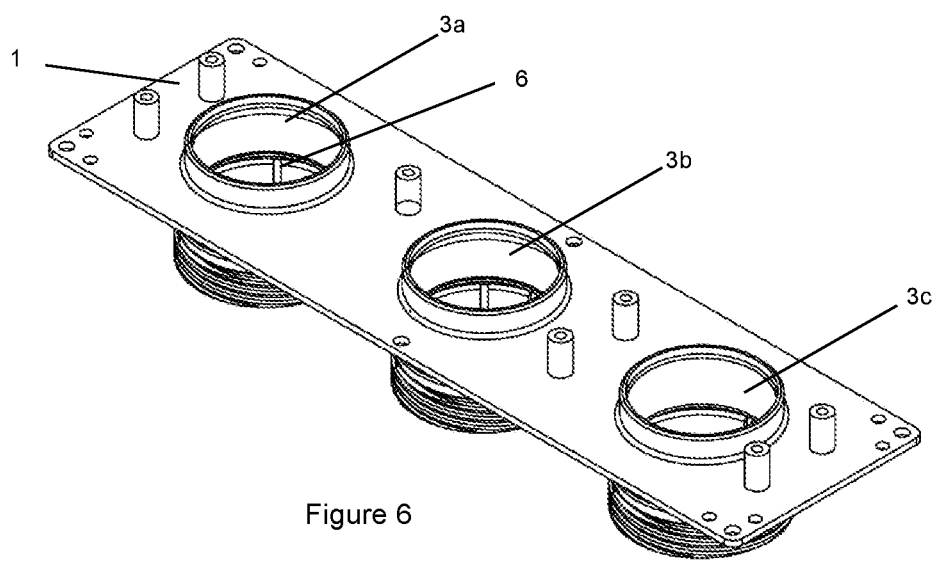
FIG. 6 is a rear perspective view of the dissipater plate of FIG. 2.

Referring first to FIG. 3, there is shown a top view of a dissipation plate 1 according to the present invention. The plate 1 has 3 openings 2a, 2b, 2c formed in it, and each opening 2a, 2b, 2c has an associated collar 3a, 3b, 3c surrounding it and upstanding from the upper surface of the plate 1 as shown in FIG. 3. The collars 3a, 3b, 3c are integrally formed with the plate 1 so the entire assembly is of unity construction.

AS best shown in FIG. 3, the outer surface 4a, 4b, 4c, of each collar 3a, 3b, 3c is threaded so as to enable a mating connector (not shown) to be secured to the collar, the mating connector being formed of metal so as to electrically connect the mating connector to the collar and hence the plate and thereby enable any unwanted charge on the connector to be conducted to and dissipated in the plate 1.

The inner surface 5a, 5b, 5c of each collar 3a, 3b, 3c also includes longitudinal splines 6 which act as alignment keys to prevent the mating connectors being engaged with the collars in the incorrect orientation, which might result in incorrect connection of electronic components. The splines 6 are also integrally formed with the plate 1 in a machining operation.

Although the illustrated embodiment has three openings and three associated collars, it will be understood that the number of openings and associated collars is not important to the invention.

The invention claimed is:

1. A charge dissipation plate for aircraft electronic systems comprising a machined metal plate having a plurality of through openings machined therein and an integrally formed collar associated with and extending around each opening, each collar upstanding from the plane of the plate, and having a threaded outer surface, each collar forming a housing for receiving an electronic connector therein, the threaded outer surface, in use, being engageable by a mating threaded connector for connecting with the electronic connector mounted in the collar.

2. The charge dissipation plate according to claim 1, wherein the plate is one of machined from solid material and cast/forged before being subjected to a machining finishing operation.

3. The charge dissipation plate according to claim 1, wherein each collar includes integral keying means which, in use, cooperates with complementary keying means provided on a male connector engageable with the collar so as to ensure correct alignment of connectors.

* * * * *